(12) United States Patent
Rydman

(10) Patent No.: US 6,523,495 B1
(45) Date of Patent: Feb. 25, 2003

(54) CAT LITTER BOX APPARATUS

(76) Inventor: Gaye A. Rydman, 6122 Van Fleet Ave., Richmond, CA (US) 94804

( * ) Notice: Subject to any disclaimer, the term of this patent is extended or adjusted under 35 U.S.C. 154(b) by 0 days.

(21) Appl. No.: 09/956,436

(22) Filed: Sep. 18, 2001

(51) Int. Cl.[7] .............................................. A01K 29/00
(52) U.S. Cl. .................................................... 119/167
(58) Field of Search ................................ 119/165, 166, 119/167, 168

(56) References Cited

U.S. PATENT DOCUMENTS

| | | | |
|---|---|---|---|
| 2,469,784 A | 5/1949 | Quinn | |
| 2,963,003 A | 12/1960 | Oberg et al. | |
| 3,310,031 A | 3/1967 | Lowe, Jr. | |
| 3,332,397 A | 7/1967 | Vander Wall | |
| 3,476,083 A | 11/1969 | Vander Wall | |
| D233,771 S | 11/1974 | Dirck et al. | |
| 4,505,226 A | 3/1985 | Carlson | |
| D286,694 S | 11/1986 | O'Rourke | |
| D288,253 S | 2/1987 | Hatton et al. | |
| D289,095 S | 3/1987 | Chiodo et al. | |
| 4,649,578 A * | 3/1987 | Vargo | |
| D289,574 S | 4/1987 | Stinner | |
| 4,771,731 A | 9/1988 | Derx et al. | |
| D300,968 S | 5/1989 | Conner | |
| D310,587 S | 9/1990 | Hinson | |
| 5,058,528 A | 10/1991 | Counseller et al. | |
| 5,184,574 A * | 2/1993 | Kirk et al. | 119/162 |
| 5,195,464 A | 3/1993 | Mutter | |
| D346,887 S | 5/1994 | Desveaux | |
| 5,402,751 A | 4/1995 | De La Chevrotiere | |
| D358,008 S | 5/1995 | Keller et al. | |
| D361,175 S | 8/1995 | VanSkiver | |
| D364,944 S | 12/1995 | Blaine | |
| D364,945 S | 12/1995 | Smothers et al. | |
| 5,482,007 A | 1/1996 | Kumlin | |
| D370,095 S | 5/1996 | Siler | |
| D370,316 S | 5/1996 | Merino | |
| D371,873 S | 7/1996 | Brassfield | |
| D377,549 S | 1/1997 | Long et al. | |
| D378,451 S | 3/1997 | Schmidt | |
| D388,912 S | 1/1998 | Hurst et al. | |
| D392,076 S | 3/1998 | Goemans | |
| 5,785,000 A * | 7/1998 | Barbary | 119/166 |
| D398,088 S | 9/1998 | Angier | |
| D398,089 S | 9/1998 | Reed | |
| D399,613 S | 10/1998 | O'Rourke et al. | |
| D408,949 S | 4/1999 | Queen | |
| D413,416 S | 8/1999 | Frank | |
| 5,988,108 A * | 11/1999 | Silver | 119/166 |
| D426,684 S | 6/2000 | Kenny | |

* cited by examiner

*Primary Examiner*—Thomas Price
(74) *Attorney, Agent, or Firm*—Beyer Weaver & Thomas LLP (57) ABSTRACT

A waste management system including a vessel having an opening into a recess defined at least partially by a bottom wall. A separation device is included having a porous surface disposed substantially laterally across the recess, and spaced-apart from, and adjacent the bottom wall. The waste management system further includes a plurality of substantially non-porous particulate material disposed atop the separation device in a manner spaced above the bottom wall such that liquids impinged upon the particulate materials are caused to pass directly therethrough and separate therefrom for collection on the bottom wall.

32 Claims, 7 Drawing Sheets

CAT LITTER BOX APPARATUS

FIELD OF THE INVENTION

The present invention pertains to an apparatus for improved cat waste containment and management. More specifically, the invention pertains to a cat litter box and litter combination for improved cat waste management.

BACKGROUND OF THE INVENTION

Although there have been many cat litter boxes developed over the years, there still remain some fundamental problems with conventional cat waste containment and management. For the most part, advances in cat waste management have focused on two main areas: the design of the cat box and the properties of the litter material used in the cat box.

Many recent additions to cat litter box design have been primarily cosmetic; however, there have been some improvements in utility. The basic litter box is generally a receptacle for receiving litter (and subsequently cat waste). Improvements in litter box design have included the addition of sieves which aid the removal of solid waste. That is, many cat boxes allow the contaminated litter to be sieved back into the box for reuse, while the solid waste is removed. Some designs also allow excess liquid waste to pass through a metal screen (below the litter) into a storage container for direct chemical treatment (e.g. lime in the storage container). Despite these advancements, there remain some fundamental problems associated with waste handling. For example, chemical treatment cleanup and disposal is messy and labor intensive. As well, storage containers are typically open trays that are unwieldy, where the likelihood of spillage of urine is high.

With respect to the litter material, sand was initially used. Clay-type particulate litters eventually replaced sand since they were more absorbent and cheaper to produce. More recent advances in litter technology have included clumping clay litter that forms agglomerates (clumps) when wetted (with urine). When sieve-type litter boxes (as described above) or shovels are employed to remove solid waste, these clumps are easily removed.

Despite these advances, there still remain problems associated with clay litters. Agitation of clay litters produces copious amounts of dust. This commonly occurs when, for example, removing spent litter, placing new litter, or especially when sieving the litter. This clay dust is not only messy; but it is also an inhalation hazard. Oftentimes pet owners need to wear dust masks when handling clay litters. Although there have been attempts at producing "dust free" clumping clay litters, these ventures have been unsuccessful.

Another problem associated with clay type litters is inherent in their function. That is, they are designed to absorb not only the pet urine, but its associated powerful odor. As with most animal life, cats urinate frequently, commonly many times a day. This requires that the litter be changed often to avoid saturation. Thus, even though clay litters are absorbent, their small particulate size limits their function.

When clay litters are used with litter boxes having collection trays for excess urine, the litter often needs to be saturated before any urine will pass into the tray. This obviates the tray as an effective collection (or deodorizing) element, because avoidance of litter saturation is desirable (due to associated smell and unsanitary conditions).

To overcome this odor problem, deodorizing agents have been added to clay litter formulations. Still, the dust problems remain as well as the need for frequent litter changes to avoid urine saturation.

What is therefore needed is improved apparatus for cat waste containment and management. More specifically, a litter box and novel litter that together cooperate to overcome the above described problems.

SUMMARY OF THE INVENTION

The present invention addresses the above-described problems associated with conventional cat litter boxes and clay litters. The invention accomplishes this through a combination of litter box design and a novel litter material. Rather than using a litter material that absorbs liquids, the present invention applies a litter that repels liquids (such as cat urine). In combination with the cat box, the litter allows passage of liquid waste into a unique storage container designed for easy disposal. The litter can be rinsed with water periodically so that residual excreta on the litter is washed into the storage container, making litter changes much less frequent.

Another aspect of the invention relates to a cat waste management system which includes a liquid-repellant litter material and a cat litter box for receiving solid and liquid cat excreta. The cat litter box includes a separation device which facilitate the separation of liquid from the liquid-repellent litter material.

Preferably, the separation device employed to separate the liquids from the liquid-repellent litter material include a filter layer disposed below and supporting the liquid-repellant litter material in the litter box. A sloped region of the box receives and supports the filter layer, whereby liquids impinged upon the liquid-repellent litter material flow through the filter layer and into a recessed separation region below said filter layer of the littler box. Generally, the filter layer is a screen, the mesh of which is small enough that the liquid-repellent litter material will not pass through. In a preferred embodiment, the screen is also made of a liquid-repellent material, so that it is resistant to urine permeation. Preferably the liquid-repellent material from which the screen comprises is polyethylene.

In one configuration, the litter box includes a drainage aperture in the recessed region of the cat litter box through which liquids traverse after passing over the liquid repellent material and through said filter layer. A removable storage container is preferably disposed below the drainage aperture into which the drained liquids collect.

In one specific implementation, the storage container is an essentially closed structure with a collection port aligned below and under the drainage aperture for collection of the drained liquids. The removable storage container further includes a disposal opening for emptying liquids from the removable storage container.

In another embodiment, the removable storage container further include a handle, proximate to said collection port and said disposal opening. The handle is used for engaging the vessel with the cat litter box, removing the vessel from the cat litter box, and carrying the storage container during transport to a site for disposal of the liquid waste. Preferably, the removable storage container slideably engages the cat litter box.

In another aspect of the waste management system of the present invention litter material is liquid repellant as opposed to absorbent as with traditional litter material. Preferably, the liquid-repellent litter material comprises polyethylene. Also preferably, the liquid repellent litter material comprises a collection of individual particles having a mean diameter of between about 1/16 and 1/2 inches, and more preferably about 1/8 inch. The litter can have a shape chosen from the group consisting of spheres, cylinders, cubes, etc. In a particularly preferred embodiment, the liquid-repellent litter material comprises pelletized polyethylene. Unlike conventional clay litters, the liquid repellent litter of the present invention need not be changed for between about 30 and 60 days.

These and other features and advantages of the present invention will be described in more detail below with reference to the associated drawings.

DETAILED DESCRIPTION OF PREFERRED EMBODIMENTS

In the following detailed description of the present invention, numerous specific embodiments are set forth in order to provide a thorough understanding of the invention. However, as will be apparent to those skilled in the art, the present invention may be practiced without these specific details or by using alternate elements or processes. In other instances well-known processes, procedures and components have not been described in detail so as not to unnecessarily obscure aspects of the present invention.

Referring now to FIGS. 1–5, a cat waste management system, generally designated 100, is provided which includes a cat litter box 101 for receiving solid and liquid excreta, and a liquid-repellant litter material 131 disposed in the litter box. A separation device 126 supporting the litter material 131 is configured to separate the disposed liquids from the liquid-repellent litter material for drainage of the liquid thereof.

Accordingly, the present invention addresses the problems associated with conventional cat litter boxes and clay litters through a novel combination of litter box design and a litter composition. Rather than using a litter material that absorbs liquids or fluids, the litter material of the present invention repels liquids (such as cat urine), causing it to quickly and gravitationally flow directly downward. Into a storage container designed for easy disposal. The litter can be rinsed with water periodically so that residual excreta on the litter is washed into the storage container, making the litter reusable and subject to fewer changes.

The cat litter box 101, which is part of the preferred cat waste management system 100 of the present invention, includes a rectangular-shaped main body 104. This main body 104 includes a front wall 107, a rear wall 109, two side walls 111, and a bottom wall 113 integrally formed to hold and contain the litter material 131 (see FIG. 10) therein. In this particular design, the front wall 107 defines an "opening" 115 to facilitate entry of a cat or the like into the litter box. Note that front wall 107 has a lowest elevation point 118 in its middle. While the main body 104 is generally rectangular, one skilled in the art would understand that the shape can be of any number of acceptable shapes or dimensions. Likewise, litter box 101 can be made of any number of materials. Preferably, main body 104 of litter box 101 is a one-piece injection molded plastic article, but this need not be the case.

Peripherally extending around the uppermost perimeter of main body 104 is an upper lip portion 102 which eases handling thereof. Depending downwardly from and disposed on the corners of the bottom wall 113 of the main body 104 are front legs 105A, 105B and rear legs 108A, 108B (see FIG. 4). These appendages cooperate to vertically space the main body 104 above the ground.

Figure 1:
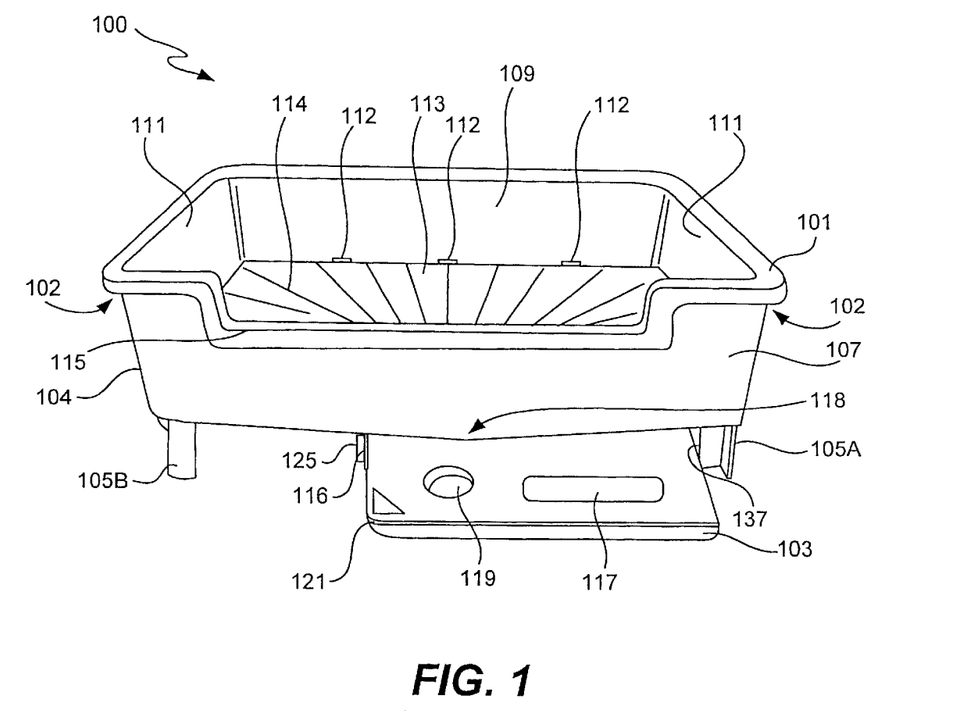
FIG. 1 is a front perspective view of a waste management system constructed in accordance with the present invention.
Figure 2:
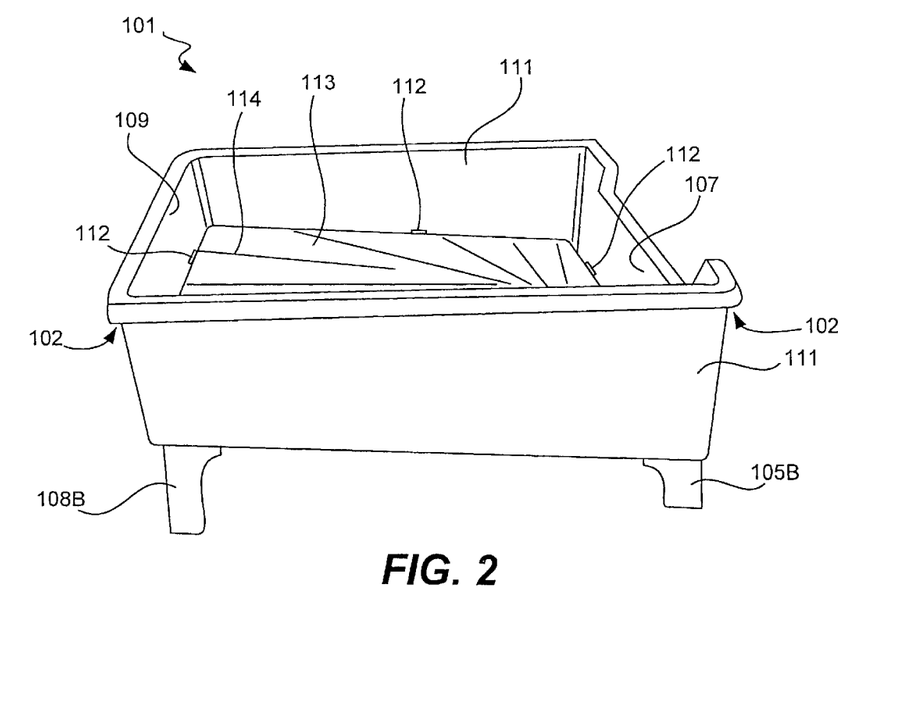
FIG. 2 is a side perspective view of the waste management system of FIG. 1.
Figure 3:
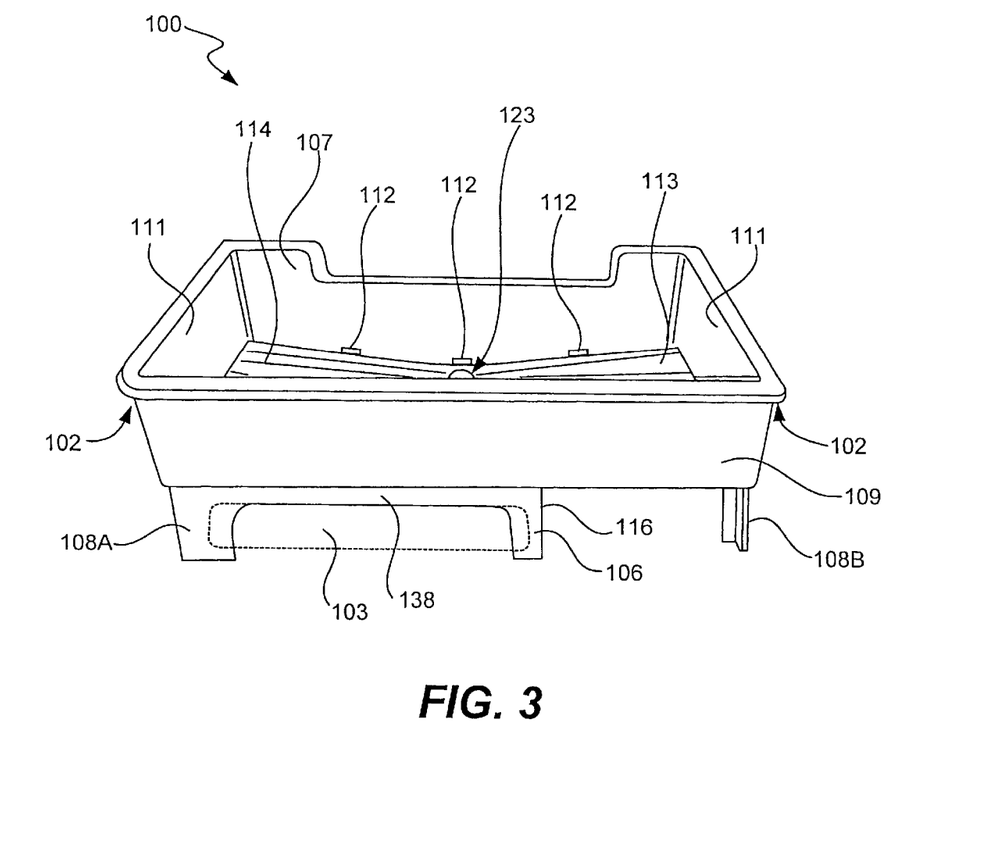
FIG. 3 is a rear perspective view of the waste management system of FIG. 1.
Figure 4:
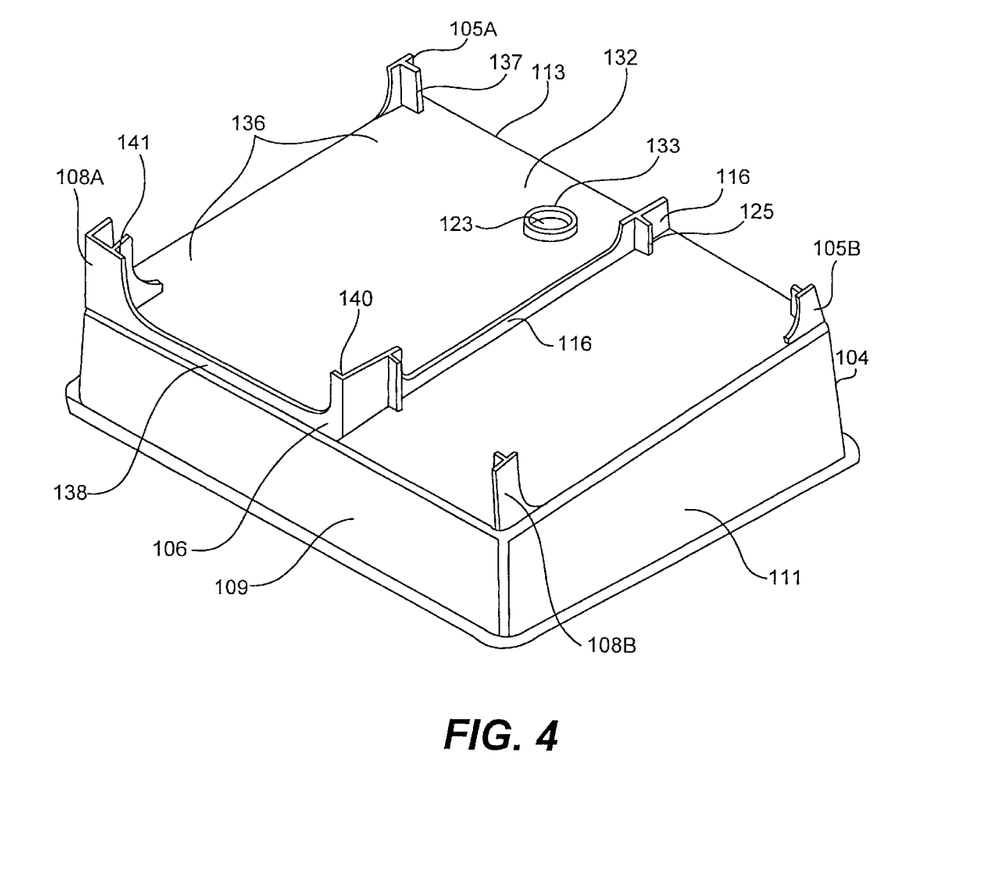
FIG. 4 is a bottom perspective view of the litter box of the waste management system of FIG. 1.
Figure 5:
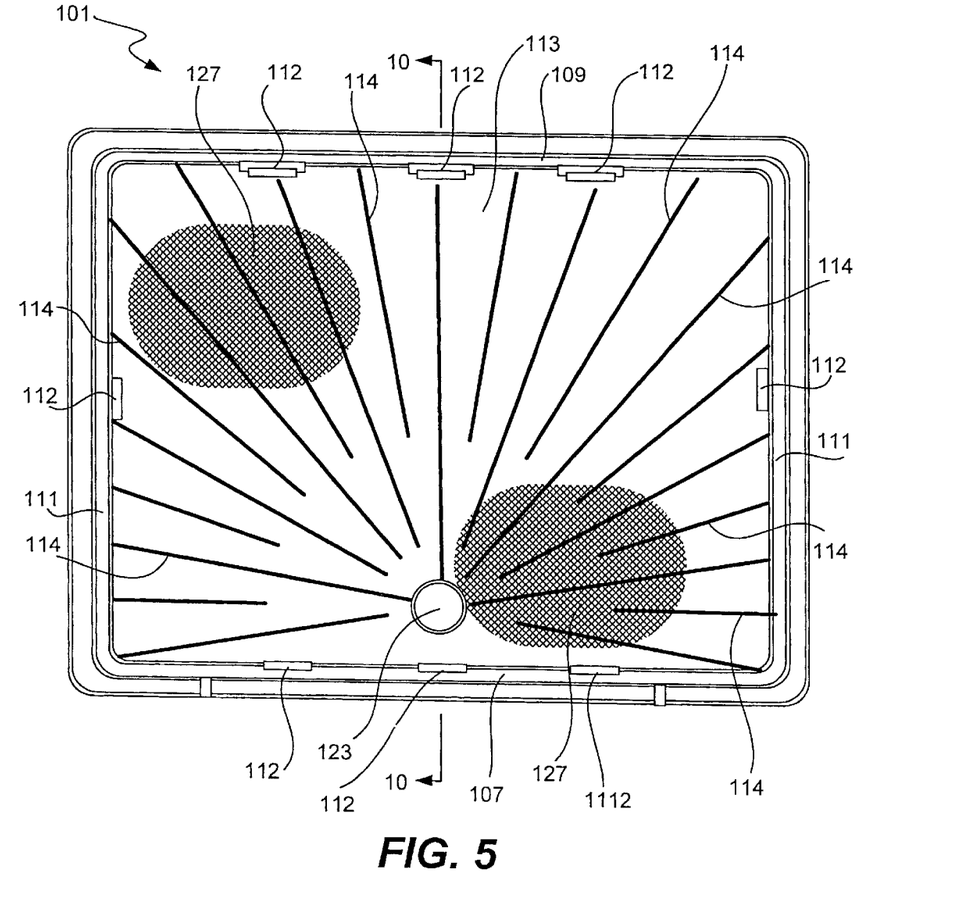
FIG. 5 is a top plan view of the waste management system of FIG. 1, and illustrating the separation screen thereof
Figure 10:
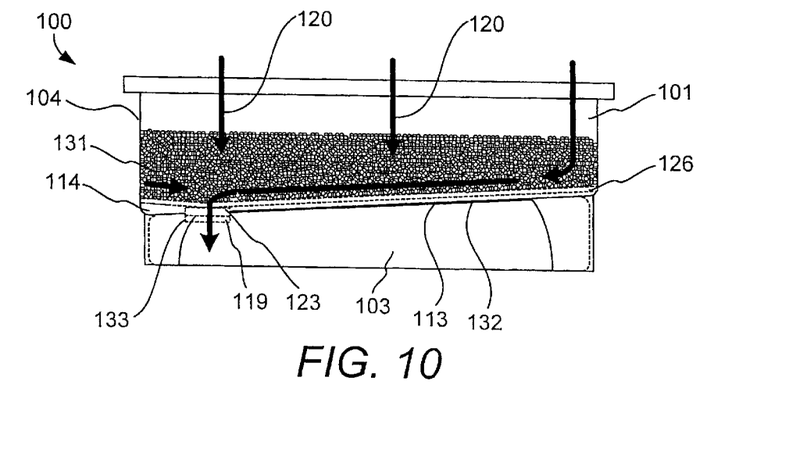
FIG. 10 is a side elevation view, in cross-section, of the waste management system taken along the plane of the line 10—10 in FIG. 5.
Figure 11:
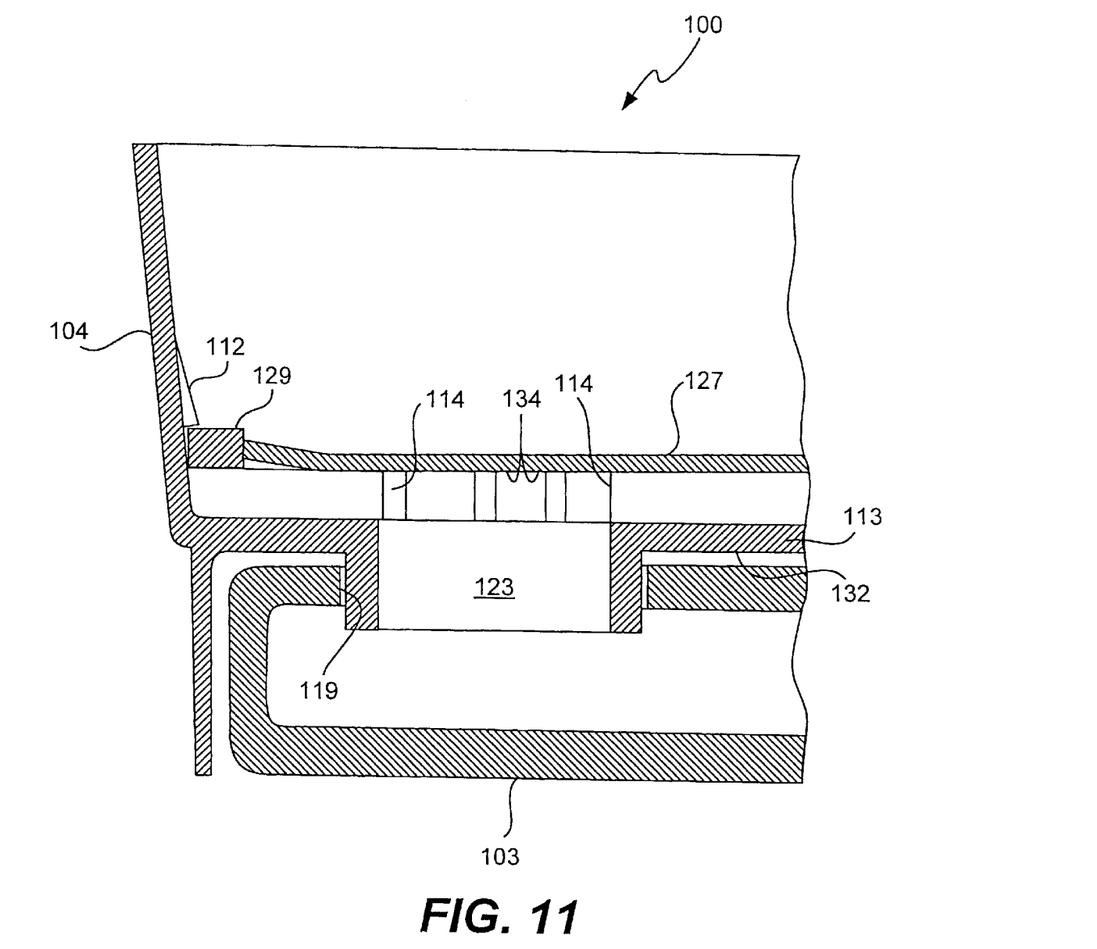
FIG. 11 is a fragmentary, enlarged, side elevation view, in cross-section, of the waste management system of FIG. 10.

Since the granulated litter material 131 does not absorb the liquid wastes, but actually repels it, the litter material essentially functions as a porous barrier to gravitationally drain the liquid straight to the bottom wall 113 of the main body, while retaining the solid wastes thereatop. In order to prevent saturation of the litter with the liquid wastes, in accordance with the present invention, the waste management system 100 includes a porous separation device 126 which supports and maintains the granulated litter material 131 above and out of contact with the bottom wall (FIGS. 5, 10 and 11). This allows liquid wastes to pass vertically through the litter material 131 (in the direction of arrows 120 in FIG. 10), and separate therefrom for collection at the bottom wall 113. Thus, the separation device 126 spaces the litter material 131 from the bottom wall so that contact with the liquid wastes is minimized.

Figure 6:
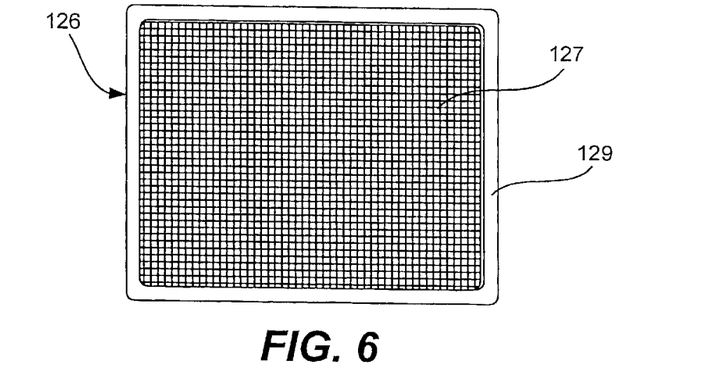
FIG. 6 is a top plan view of the separation screen device of FIG. 5.

The separation device 126 is sufficiently porous to allow the passage of the liquid wastes therethrough. Preferably, separation device 126 includes a framed screen mesh material (see FIG. 6). To retain the litter material 131 thereatop, while permitting the passage the liquid waste therethrough, the transverse cross-sectional dimension of the passages of the mesh are sized sufficiently smaller than that of the individual granulated litter material 131. In a preferred embodiment, the screen may include a liquid-repellent material coating so that it is resistant to urine permeation. Moreover, the screen may include dispensing nubs 134 (FIG. 11) at each mesh intersection which facilitate separation of the liquid wastes from the screen material.

As best viewed in the top plan view of FIG. 5, the coverage area of the screen material 127 is sufficient to cover the entire horizontal surface area of the bottom wall 113, in order to support and maintain granulated litter material 131 above and out of contact with bottom wall 113. To support and space the screen material 127 above the bottom wall, a plurality of strategically spaced support ridges 114 (to be described below) depend upwardly from the bottom wall 113 (FIGS. 5 and 11). When the separation device is weighted with the granulated litter material 131, the flexible screen material 127 contacts and is supported by the ridges 114. These ridges can be of any height depending upon the desired spacing from the bottom wall 113. Preferably, the height is in the range of about 1/8 inch to about 3/16 inch.

To mount the separation device 126 to the litter box 101, the frame 129 is sized to engage and cooperate with the box when the screen is supported atop the support ridges 114. Thus, the peripheral dimensions of frame 129 are such that its outer perimeter fits snugly against and engages the inner surfaces of front wall 107, rear wall 109, and side walls 111. The separation device is further retained in place by a plurality of spaced-apart, elongated locking nubs or clips 112 (FIGS. 1–3, 5 and 11) disposed along the inner lowermost perimeter of the walls of main body 104. These clips 112 extend inwardly from the interior walls by about 1/8 inch to about 3/16 inch so that the frame 129 must be press-fit over and downwardly below the clips to retain the separation device into place. To reduce slack, the spacing of the bottom of the nub or clip 112 from the support ridges 114 (FIG. 11) is substantially similar to the height to the frame 129, preferably in the range of about 1/8 inch to about 3/16 inch. Accordingly, once in place, the screen prevents litter material 131 from passing through to bottom wall 113.

Referring now to FIGS. 1–3 and 10, the bottom wall 113 is locationally sloped for gravitational flow of the collected waste fluids toward a drainage aperture 123 for drainage thereof from the litter box 101. The bottom wall, more preferably, is funnelshaped toward the drainage aperture 123, which is positioned proximate a central portion of the front wall 107. Thus, after the liquid wastes pass vertically through the litter material 131, they are further discarded from the litter box 101 through drainage aperture 123 (in the direction of arrows 130 in FIG. 10) to prevent pooling at the bottom wall 113.

To facilitate drainage toward the drainage aperture 123, FIG. 5 best illustrates that the support ridges 114 are staggered and extend radially from the aperture. When the collected liquid wastes impinges upon the bottom wall, accordingly, these ridges not only support the separation device, but also direct the flow of liquids toward the aperture for discard thereof.

In accordance with another aspect of the present invention, the waste management system 100 of the present invention further includes a storage container, generally designated 103, positioned below the litter box 101 to collect the liquid wastes as they are discarded through the drainage aperture 123. As shown in FIGS. 1, and 7–10, this substantially hollow storage container 103 includes a collection port 119 in flow communication with the drainage aperture 123 of the bottom wall 113 to enable free flow of the wastes into the container for storage thereof. More preferably, the drainage aperture 123 and the collection port 119 are coaxially aligned, substantially vertically, for gravitational flow more directly into the container 103 (in the direction of arrows 130 in FIG. 10).

FIGS. 11 best illustrates that the bottom facing surface 132 of bottom wall 113 includes an annular, downwardly depending nipple portion 133 upon which the drainage aperture 123 passes therethrough. To reduce spillage, this nipple portion 133 is adapted to insert and extend into the collection port 119 when the drainage aperture is coaxially aligned with the port. This assures that the liquid wastes funnel directly into the storage container 103 from the litter box 101.

The outer diameter of the nipple portion 133 is similar to that of the inner diameter of the collection port 119 so that the nipple portion can extend freely into the collection port 119. However, the tolerance between the diameters of the nipple portion and the collection port should not be so large as to allow significant lateral displacement between the litter box and the storage container. By way of example, when the outer diameter of the nipple portion 133 is in the range of about 1 1/4 inch to about 1 1/2 inch, and while the inner diameter of the collection port 119 is in the range of about 1 1/2 inch to about 1 5/8 inch, the preferred tolerance therebetween is in the range of about +/−1/16 inch to about +/−1/4 inch.

This configuration is beneficial in that when the nipple portion 133 is engaged in the collection port 119 of the storage container 103, the litter box 101 will be removably mounted to the storage container so that they cannot be laterally separated. Thus, only vertical displacement, and not lateral displacement, between litter box and the storage container of the waste management system 100 will cause the nipple portion 133 to disengage from insertion in the collection port 119.

To prevent rotational displacement about the longitudinal axis of the collection port 119, the nipple portion 133 and the collection port can be non-circular in shaped. In this manner, rotational alignment between the litter box and the storage container will also be required before insertion of the nipple portion 133 into the collection port 119. Another technique is to provide a key and slot mechanism.

In yet another specific embodiment, the storage container 103 is sized and shaped to engage the litter box 101 in a manner preventing rotational displacement about the collection port longitudinal axis. As best viewed in FIGS. 8 and 10, an upper surface 135 of the storage container 103 which defines the collection port 119 is contoured to position substantially adjacent to the bottom surface 132 of the sloped bottom wall 113 of the litter box 101 when the storage container 103 is mounted to and aligned with the litter box. Accordingly, substantial rotational displacement between the litter box 101 and the storage container 103 about the collection port longitudinal axis will be prevented as the upper surface 135 of the storage container 103 slideably engages the bottom surface 132 of the litter box 101.

Moreover, the front leg 105A and rear leg 108A cooperate with a guide rail 116 to form a retaining pocket 136 (FIG. 4) for aligned receipt of the storage container 103 therein in a retained manner. The guide rail 116 extends from the front to the rear of the litter box 101, and is supported by a strut 125. Preferably, the guide rail and the strut are integrally formed with and depend downwardly from the bottom surface 132 of the bottom wall 113. This guide rail 116 cooperates with a guide edge 137 of the front leg 105A to facilitated aligned engagement when the storage container 103 is being positioned and engaged in the retaining pocket 136 of the litter box 101. To further facilitate guided receipt, a stop plate 138 extends between the rear leg 108A and the middle rear leg 106. Each of these rear legs 106 and 108A defines a corner pocket portion 140, 141, respectively, which together with the stop plate 138, engage the rear portion of the storage container 103 to position it in the retaining pocket. Thus, when the storage container 103 is properly positioned in the retaining pocket, and the drainage aperture 123 and the collection port 119 are coaxially aligned, the storage container will be laterally locked to the litter box to prevent lateral displacement therebetween. More importantly, this design configuration prevents lateral separation between the nipple portion 133 of the litter box 101 and the collection port 119 of the storage container 103.

Figure 7:
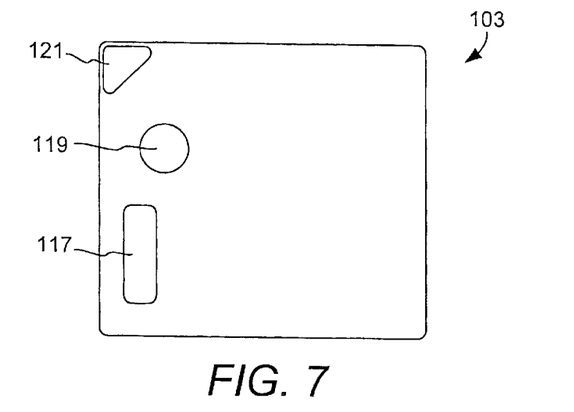
FIG. 7 is a top plan view of a removable storage container for the waste management system of FIG. 1.

Referring back to FIGS. 7–9, the storage container 103 is preferably constructed of a one-piece blow molded unit which further includes a handle 117 and a disposal opening 121 for discard of the collected liquid wastes therefrom. The disposal opening 121 is preferably at a front corner position of the storage container 103 so that during pouring of the liquid wastes from the container, the liquid flows only out of disposal opening 121 and not through the collection port 119. FIG. 7 best illustrates that the disposal opening 121 triangular-shaped to facilitate pouring therefrom without splashing or extraneous dripping.

Figure 8:
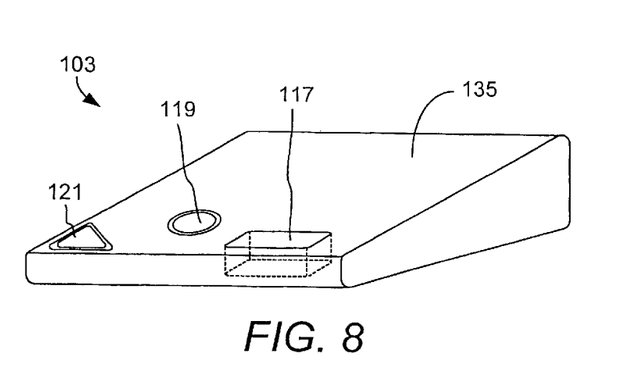
FIG. 8 is a side perspective view of the removable storage container of FIG. 7.

FIG. 8 best depicts that the handle 117 is provided by a channel formed in the container body. A user can therefore easily grasp the handle 117 by inserting their fingers through the channel to carry the container in the upright position shown in FIG. 9. The handle 117 is also positioned at the front portion of storage container 103 so that when the storage container is carried upright, the collection port 119 and disposal opening 121 are located at the top position. Thus, during transport of the liquid waste 130, accidental spillage from the collection port 119 or the disposal opening 121 are reduced.

Figure 9:
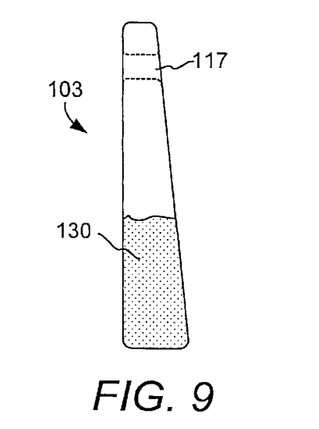
FIG. 9 is a cross-sectional side elevation view of the removable storage container of FIG. 7.

As above mentioned, the upper surface 135 of the storage container 103 is sloped to conform with the slope of the bottom surface 132 of the litter box bottom wall 113. The transverse cross-section dimension of the container is thus trapezoidal-shaped. This design, however, is beneficial since the container will be more stable when carried upright (FIG. 9). Since a larger percentage of volume of the liquid 130 is carried at the bottom portion of the storage container 103 than at the top portion thereof, when upright, the center of gravity is lowered for more stability during transport and handling.

Because the waste management system 100 of the invention uses a liquid-repellent litter material 131, several advantages over conventional absorbent litters are realized. For one, the litter material need not be discarded and may be periodically cleaned for reuse. By way of example, during a typical waste cleaning operation, solid waste is initially removed (e.g. scooped) from litter material 131 and properly disposed. Then the litter material is rinsed with water to remove not only urine, but also any small amounts of solid excreta that remain on the litter material. As described, the rinse water flows into storage container 103 for easy disposal (via disposal opening 121) into a toilet or other proper disposal unit. Preferably this cleaning process is done daily.

Depending upon the material composition, the liquid repellent litter material may eventually retain some finite amount of odor from repeated exposure to urine or excrement. Thus, unlike conventional clay litters, the litter of the present invention does not require changing for between about 30 and 60 days.

Another advantage of the litter material of the present invention is that it does not generally break down into finer and finer particles. Thus, the litter is substantially dust free. Yet another benefit is that whenever stool or urine are to be analyzed for worms (for example), the instant waste management system 100 allows the pet owner to analyze the rinses from the entire litter material. Small worms or other parasites will be rinsed into the storage container for easy isolation and characterization. This feature is particularly useful to veterinarians as well.

The liquid repellent litter material 131 of the present invention is comprised of a collection of individual or granulated particles having a diameters ranging between about 1/8 inch and about 1/4 inch. The litter particulates can have any shape as well, such as spheres, cylinders, squares, etc. It will be appreciated, however, that smoother surfaces are preferred to avoid deposition thereon and facilitate rinsing of excretia and urine therefrom.

Such liquid-repellent litter material are composed of inert, non-porous materials such as plastics, metals, non-porous rocks, ceramics, and plastics. More preferably, the liquid-repellent litter material comprises pelletized polyethylene.

Although various details have been omitted for clarity's sake, various design alternatives may be implemented. Therefore, the present examples are to be considered as illustrative and not restrictive, and the invention is not to be limited to the details given herein, but may be modified within the scope of the appended claims.

What is claimed is:

1. A cat waste management system, comprising:
   a vessel having an opening into a recess defined at least partially by a bottom wall, said bottom wall being sloped toward a syncline portion thereof;
   a plurality of ridges upstanding from said bottom wall of the vessel, each ridge extending in a direction substantially radially from said syncline portion to a respective position at least proximate the peripheral edge of said bottom wall;
   a separation device having a porous material disposed substantially laterally across the recess, and spaced-apart from and adjacent the bottom wall such that when a plurality of litter particulates are disposed atop said separation device, said particulates are spaced above said bottom wall, and such that when cat urine impinges upon said particulates, the urine is caused to pass directly through said separation device and separate therefrom, the pass-through urine contacting said bottom wall, and caused to flow directly toward said syncline portion by adjacent ridges and in a manner reducing lateral spread of said urine across said bottom wall.

2. The waste management system of claim 1, wherein said porous material of the separation device includes a flexible mesh material having openings therethrough smaller in diameter than that of the individual particulates, said mesh material being sufficiently flexible such that the collective weight of the particulates cause said mesh to be supported atop the ridges.

3. The waste management system of claim 2, wherein said separation device further includes a peripheral support frame peripherally extending about said mesh material.

4. The waste management system of claim 3, wherein said support frame is adapted to engage said vessel for removable mounting thereto.

5. The waste management system of claim 4, wherein the vessel includes a main body having upstanding walls formed to press-fit engage said support frame for said removable mounting thereto.

6. The waste management system of claim 5, wherein said upstanding walls of said vessel includes a plurality of locking nubs extending into said recess, and adapted to press-fit said support frame against said support ridges.

7. The waste management system of claim 2, wherein said mesh material includes a plurality of downwardly depending dispensing nubs situated at mesh intersections thereof to facilitate separation of the urine from the mesh material.

8. The waste management system of claim 9, wherein said container includes a handle proximate said one side of the container wall to facilitate carrying of the container in the upright position.

9. The waste management system of claim 1, wherein
said syncline portion of the bottom wall include a drainage aperture for drainage of the collected liquid wastes therethrough; and further including:
a storage container disposed below said vessel, and having a collection port in receipt of the collect liquid wastes when the collection port is co-aligned with said drainage aperture.

10. The waste management system of claim 9, wherein
said bottom wall is funnel-shaped toward said drainage aperture.

11. The waste management system of claim 9, wherein
said bottom wall includes a nipple portion having said drainage aperture extending therethrough, said nipple portion being formed and dimensioned to engage and extend into said collection port of said vessel for mated engagement therewith.

12. The waste management system of claim 11, wherein
said storage container is peripherally dimensioned to engage said vessel, when said nipple portion is matably engaged in said collection port, to substantially prevent rotation thereabout.

13. The waste management system of claim 9, wherein
said collection port being disposed on a container wall of said storage container opposing said bottom wall of the vessel, when said storage container is disposed below said vessel, said collection port further being off-set from a center portion of the container wall toward one side thereof such that when the storage container is repositioned in a designated upright position for transport where said container wall is then positioned generally vertically, and said one side of the upright container wall is then respectively position at an upper portion thereof, said collection port is positioned proximate the upper one side of the upright container wall to substantially reduce spillage of the contained urine from said collection port during transport.

14. The waste management system of claim 13, wherein
said storage container is configured to have a container volume greater at a lower portion thereof, when in the upright position, than the container volume at the upper portion thereof in a manner lowering the center of gravity to reduce tipping of the upright storage container.

15. The waste management system of claim 14, wherein
said container wall of said container includes an opposed side positioned opposite said one side thereof, such that opposed side is at the lower portion of the container wall when positioned in the upright position, and said container wall being sloped from said opposed side toward said one side to at least partially create the greater container volume at a lower portion of the upright container than at the upper portion thereof.

16. The waste management system of claim 14, wherein
said container wall of said container includes an opposed side positioned opposite said one side thereof, such that opposed side is at the lower portion of the container wall when positioned in the upright position, and said container wall being sloped from said opposed side toward said one side to at least partially create the greater container volume at a lower portion of the upright container than at the upper portion thereof.

17. The waste management system of claim 9, wherein
at least a portion of said bottom wall is sloped toward said drainage aperture.

18. The waste management system of claim 17, wherein
said bottom wall is funnel-shaped toward said drainage aperture.

19. The waste management system of claim 17, wherein
said bottom wall includes a nipple portion having said drainage aperture extending therethrough, said nipple portion being formed and dimensioned to engage and extend into said collection port of said vessel for mated engagement therewith.

20. The waste management system of claim 1, wherein
said particulate material is substantially non-absorbent.

21. The waste management system of claim 20, wherein
said particulate material is composed of pelletized polyethlyene.

22. A cat waste management system, comprising:
a vessel having an opening into a recess defined at least partially by a bottom wall, said bottom wall defining a drainage aperture for drainage of the collected liquid wastes therethrough;
a separation device having a porous material disposed substantially laterally across the recess, and spaced-apart from and adjacent the bottom wall such that when a plurality of litter particulates are disposed atop said separation device, said particulates are spaced above said bottom wall, and such that when liquid wastes impinge upon said particulates, said wastes are caused to pass directly through said separation device and separate therefrom, the pass-through urine contacting said bottom wall and flowing toward said drainage aperture; and
a storage container disposed below said vessel in a collection position, and having a container wall in generally opposed relationship to said bottom wall of the vessel, said container wall defining a collection port in receipt of the collect liquid wastes flowing through said drainage aperture when the collection port is co-aligned with said drainage aperture in the collection position, and said collection port being disposed at a location off-set from a center portion of the container wall toward one side thereof such that when the storage container is repositioned in a designated upright position for transport where said container wall is then positioned generally vertically, and said one side of the upright container wall is then respectively position at an upper portion thereof, said collection port is positioned proximate the upper one side of the upright container wall to substantially reduce spillage of the contained urine from said collection port during transport.

23. The waste management system of claim 22, wherein
the storage container in said upright position is rotated about 90° from said collection position thereof.

24. The waste management system of claim 22, wherein
said container includes a handle proximate said one side of the container wall to facilitate carrying of the container in the upright position.

25. The waste management system of claim 22, wherein
said storage container is configured to have a container volume greater at a respective lower portion thereof, when in the upright position, than the container volume at the respective upper portion thereof in a manner lowering the center of gravity to reduce tipping of the upright storage container.

26. The waste management system of claim 22, wherein
said particulate material is substantially non-absorbent.

27. A cat waste management system, comprising:

a vessel having an opening into a recess defined at least partially by a bottom wall, said bottom wall defining a drainage aperture for drainage of the collected liquid wastes therethrough;

a separation device having a porous material disposed substantially laterally across the recess, and spaced-apart from and adjacent the bottom wall such that when a plurality of litter particulates are disposed atop said separation device, said particulates are spaced above said bottom wall, and such that when liquid wastes impinge upon said particulates, said wastes are caused to pass directly through said separation device and separate therefrom, the pass-through urine contacting said bottom wall and flowing toward said drainage aperture; and a storage container disposed below said vessel in a collection position, and having a container wall in generally opposed relationship to said bottom wall of the vessel, said container wall defining a collection port in receipt of the collect liquid wastes flowing through said drainage aperture when the collection port is co-aligned with said drainage aperture in the collection position, said storage container is further configured to have a container volume greater at a respective lower portion thereof, when the storage container is repositioned in a designated upright position for transport where said container wall is then positioned generally vertically, than the container volume at the respective upper portion thereof in a manner lowering the center of gravity to reduce tipping of the upright storage container.

28. The waste management system of claim 27 wherein the storage container in said upright position is rotated about 90° from said collection position thereof.

29. The waste management system of claim 27, wherein said container includes a handle proximate said upper portion of the container wall to facilitate carrying of the container in the upright position.

30. The waste management system of claim 27, wherein said container wall of said container is sloped upwardly from one side of the container wall to an opposed side thereof, such that said opposed side is oriented at the respective lower portion of the container wall when positioned in the upright position, and to at least partially create the greater container volume at a lower portion of the upright container than at the upper portion thereof.

31. The waste management system of claim 30, wherein at least a portion of said bottom wall is sloped toward said drainage aperture, the slope of the bottom wall substantially matching the slope of said container wall, such that the vessel bottom wall and the container wall are substantially parallel when the storage container is situated in the collection position and mated to the vessel.

32. The waste management system of claim 31, wherein said bottom wall includes a nipple portion having said drainage aperture extending therethrough, said nipple portion being formed and dimensioned to engage and extend into said collection port of said vessel for mated engagement therewith.

\* \* \* \* \*